US006976173B2

(12) United States Patent
Krasinski et al.

(10) Patent No.: US 6,976,173 B2
(45) Date of Patent: Dec. 13, 2005

(54) METHODS OF ATTACK ON A CONTENT SCREENING ALGORITHM BASED ON ADULTERATION OF MARKED CONTENT

(75) Inventors: Raymond Krasinski, Suffern, NY (US); Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 840 days.

(21) Appl. No.: 09/966,435

(22) Filed: Sep. 28, 2001

(65) Prior Publication Data

US 2002/0144133 A1 Oct. 3, 2002

Related U.S. Application Data

(60) Provisional application No. 60/279,639, filed on Mar. 29, 2001.

(51) Int. Cl.$^7$ ................................................. G06F 1/26
(52) U.S. Cl. ....................... 713/193; 713/200; 713/201
(58) Field of Search ................................ 713/193, 200, 713/201

(56) References Cited

U.S. PATENT DOCUMENTS

| 5,933,798 | A | | 8/1999 | Linnartz et al. ............ 702/191 |
|---|---|---|---|---|
| 5,999,740 | A | * | 12/1999 | Rowley ...................... 717/173 |
| 6,385,596 | B1 | * | 5/2002 | Wiser et al. .................. 705/51 |
| 6,473,560 | B1 | | 10/2002 | Linnartz et al. .............. 386/94 |

FOREIGN PATENT DOCUMENTS

WO 9948290 A2 9/1999

OTHER PUBLICATIONS

Secure Digital Music Initiative (SDMI), SDMI Portable Device Specification, Part 1, Version 1.0, pp. 1-35, Jul. 8, 1999.
Secure Digital Music Initiative (SDMI), Amendment 1 to SDMI Portable Device Specification, Part 1, Version 1.0, pp. 1-2, Sep. 23, 1999.
Secure Digital Music Initiative (SDMI), Guide to the SDMI Portable Device Specification, Part 1, pp. 1-5.
US 000040, U.S. Appl. No. 09/536,944, filed Mar. 29, 2000.
XP-002227750, Audio Identification Technology Provides the Cornerstone for Online Distribution.
XP-000980049, Robust Audio Watermarking for Copyright Protection.
XP008012690, The Watermark Copy Attack.
XP-002227752, RIAA Challenges SDMI Attack.
XP-002217955, StirMark Benchmark: Audio Watermarking Attacks.

* cited by examiner

Primary Examiner—Thomas R. Peeso

(57) ABSTRACT

Methods and apparatus for attacking a screening algorithm. The methods include the steps of marking content to be downloaded, inserting at least one section of legitimate content into the marked content, and subjecting the content to a screening algorithm. The screening algorithm may include the steps of determining a number of segments that are included within the content, selecting at least two segments within the content, screening the two segments to determine whether the two segments verify correctly through the screening algorithm, and downloading the content when it is determined that the two segments verify correctly through the screening algorithm. Once the content has been successfully downloaded, the integrity of the downloaded content may be restored by removing the legitimate content that was previously inserted into the downloaded content.

20 Claims, 3 Drawing Sheets

| SongLength (seconds) | 15 | 30 | 45 | 60 | 75 | 90 | 105 | 120 | 135 | 150 | 165 | 180 | 195 | 210 |
|---|---|---|---|---|---|---|---|---|---|---|---|---|---|---|
| SongLength (sections) | 1 | 2 | 3 | 4 | 5 | 6 | 7 | 8 | 9 | 10 | 11 | 12 | 13 | 14 |
| Legitimate Sections | | | | | | | | | | | | | | |
| 1 | 100.0% | 25.0% | 11.1% | 6.3% | 4.0% | 2.8% | 2.0% | 1.6% | 1.2% | 1.0% | 0.8% | 0.7% | 0.6% | 0.5% |
| 2 | | 100.0% | 44.4% | 25.0% | 16.0% | 11.1% | 8.2% | 6.3% | 4.9% | 4.0% | 3.3% | 2.8% | 2.4% | 2.0% |
| 3 | | | 100.0% | 56.3% | 36.0% | 25.0% | 18.4% | 14.1% | 11.1% | 9.0% | 7.4% | 6.3% | 5.3% | 4.6% |
| 4 | | | | 100.0% | 64.0% | 44.4% | 32.7% | 25.0% | 19.8% | 16.0% | 13.2% | 11.1% | 9.5% | 8.2% |
| 5 | | | | | 100.0% | 69.4% | 51.0% | 39.1% | 30.9% | 25.0% | 20.7% | 17.4% | 14.8% | 12.8% |
| 6 | | | | | | 100.0% | 73.5% | 56.3% | 44.4% | 36.0% | 29.8% | 25.0% | 21.3% | 18.4% |
| 7 | | | | | | | 100.0% | 76.6% | 60.5% | 49.0% | 40.5% | 34.0% | 29.0% | 25.0% |
| 8 | | | | | | | | 100.0% | 79.0% | 64.0% | 52.9% | 44.4% | 37.9% | 32.7% |
| 9 | | | | | | | | | 100.0% | 81.0% | 66.9% | 56.3% | 47.9% | 41.3% |
| 10 | | | | | | | | | | 100.0% | 82.6% | 69.4% | 59.2% | 51.0% |
| 11 | | | | | | | | | | | 100.0% | 84.0% | 71.6% | 61.7% |
| 12 | | | | | | | | | | | | 100.0% | 85.2% | 73.5% |
| 13 | | | | | | | | | | | | | 100.0% | 86.2% |
| 14 | | | | | | | | | | | | | | 100.0% |
| 15 | | | | | | | | | | | | | | |

FIG. 3

METHODS OF ATTACK ON A CONTENT SCREENING ALGORITHM BASED ON ADULTERATION OF MARKED CONTENT

CROSS REFERENCE TO RELATED APPLICATION

This application claims priority to the U.S. provisional patent application identified by Ser. No. 60/279,639, filed on Mar. 29, 2001, the disclosure of which is incorporated by reference herein.

FIELD OF THE INVENTION

The present invention relates generally to the field of secure communication, and more particularly to techniques for attacking a content screening algorithm based on adulteration of marked content.

BACKGROUND OF THE INVENTION

Security is an increasingly important concern in the delivery of music or other types of content over global communication networks such as the Internet. More particularly, the successful implementation of such network-based content delivery systems depends in large part on ensuring that content providers receive appropriate copyright royalties and that the delivered content cannot be pirated or otherwise subjected to unlawful exploitation.

With regard to delivery of music content, a cooperative development effort known as Secure Digital Music Initiative (SDMI) has recently been formed by leading recording industry and technology companies. The goal of SDMI is the development of an open, interoperable architecture for digital music security. This will answer consumer demand for convenient accessibility to quality digital music, while also providing copyright protection so as to protect investment in content development and delivery. SDMI has produced a standard specification for portable music devices, the SDMI Portable Device Specification, Part 1, Version 1.0, 1999, and an amendment thereto issued later that year, each of which are incorporated by reference. The longer-term effort of SDMI is currently working toward completion of an overall architecture for delivery of digital music in all forms.

The illicit distribution of copyright material deprives the holder of the copyright legitimate royalties of this material, and could provide the supplier of this illicitly distributed material with gains that encourage continued illicit distributions. In light of the ease of information transfer provided by the Internet, content that is intended to be copy-protected, such as artistic renderings or other material having limited distribution rights, are susceptible to wide-scale illicit distribution. For example, the MP3 format for storing and transmitting compressed audio files has made the wide-scale distribution of audio recordings feasible, because a 30 or 40 megabyte digital audio recording of a song can be compressed into a 3 or 4 megabyte MP3 file. Using a typical 56 kbps dial-up connection to the Internet, this MP3 file can be downloaded to a user's computer in a few minutes. Thus, a malicious party could read songs from an original and legitimate CD, encode the songs into MP3 format, and place the MP3 encoded song on the Internet for wide-scale illicit distribution. Alternatively, the malicious party could provide a direct dial-in service for downloading the MP3 encoded song. The illicit copy of the MP3 encoded song can be subsequently rendered by software or hardware devices, or can be decompressed and stored onto a recordable CD for playback on a conventional CD player.

A number of schemes have been proposed for limiting the reproduction of copy-protected content. SDMI and others advocate the use of "Digital Watermarks" to identify authorized content. U.S. Pat. No. 5,933,798, "Detecting a watermark embedded in an information system," issued 16 Jul. 1997 to Johan P. Linnartz, discloses a technique for watermarking electronic content, and is incorporated by reference herein. As in its paper watermark counterpart, a digital watermark is embedded in the content so as to be detectable, but unobtrusive. An audio playback of a digital music recording containing a watermark, for example, will be substantially indistinguishable from a playback of the same recording without the watermark. A watermark detection device, however, is able to distinguish these two recordings based on the presence or absence of the watermark. Because some content may not be copy-protected and hence may not contain a watermark, the absence of a watermark cannot be used to distinguish legitimate from illegitimate material. On the contrary, the absence of a watermark is indicative of content material that can be legitimately copied freely.

Other copy protection schemes are also available. For example, European patent EP983687A2, "Copy Protection Schemes for Copy-protected Digital Material," issued 8 Mar. 2000 to Johan P. Linnartz and Johan C. Talstra, presents a technique for the protection of copyright material via the use of a watermark "ticket" that controls the number of times the protected material may be rendered, and is incorporated by reference herein.

An accurate reproduction of watermarked content will cause the watermark to be reproduced in the copy of the watermarked content. An inaccurate, or lossy reproduction of watermarked content, however, may not provide a reproduction of the watermark in the copy of the content. A number of protection schemes, including those of the SDMI, have taken advantage of this characteristic of lossy reproduction to distinguish legitimate content from illegitimate content, based on the presence or absence of an appropriate watermark. In the SDMI scenario, two types of watermarks are defined: "robust" watermarks, and "fragile" watermarks. A robust watermark is one that is expected to survive a lossy reproduction that is designed to retain a substantial portion of the original content, such as an MP3 encoding of an audio recording. That is, if the reproduction retains sufficient information to allow a reasonable rendering of the original recording, the robust watermark will also be retained. A fragile watermark, on the other hand, is one that is expected to be corrupted by a lossy reproduction or other illicit tampering.

In the SDMI scheme, the presence of a robust watermark indicates that the content is copy-protected, and the absence or corruption of a corresponding fragile watermark when a robust watermark is present indicates that the copy-protected content has been tampered with in some manner. An SDMI compliant device is configured to refuse to render watermarked material with a corrupted watermark, or with a detected robust watermark but an absent fragile watermark, except if the corruption or absence of the watermark is justified by an "SDMI-certified" process, such as an SDMI compression of copy-protected content for use on a portable player. For ease of reference and understanding, the term "render" is used herein to include any processing or transferring of the content, such as playing, recording, converting, validating, storing, loading, and the like. This scheme serves to limit the distribution of content via MP3 or other compression techniques, but does not affect the distribution of counterfeit unaltered (uncompressed) reproductions of content material. This limited protection is deemed commercially viable, because the cost and inconvenience of downloading an extremely large file to obtain a song will tend to discourage the theft of uncompressed content.

Despite SDMI and other ongoing efforts, existing techniques for secure distribution of music and other content suffer from a number of significant drawbacks. For example, SDMI Lite has recently proposed the use of a new screening algorithm referred to as SDMI Lite. The SDMI Lite algorithm essentially screens only two sections of the content which is being downloaded. Thus, prior to adopting this screening approach industry wide, methods must be identified which would successfully circumvent the proposed screening algorithm.

SUMMARY OF THE INVENTION

The present invention in an illustrative embodiment provides a method of attacking and circumventing the proposed SDMI Lite screening algorithm as described herein. The method is based on the concept of adulteration of content to the point where the attacker's chance of successfully admitting the illicit content is greatly improved.

An advantage of the present invention is that it identifies at least one fault in a security screening algorithm. It is only through the detection and identification of faults that the underlying screening algorithm can be improved to provide convenient, efficient and cost-effective protection for all content providers.

In accordance with one aspect of the invention, a method of attacking a screening algorithm includes the steps of identifying content to be downloaded, inserting at least one section of legitimate content into the content to be downloaded, and subjecting the content to be downloaded, having the section of legitimate content inserted therein, to a screening algorithm. The screening algorithm in the illustrative embodiment includes the steps of determining a number of e.g., fifteen second sections that are included within the content to be downloaded, selecting at least two segments within the content to be downloaded, screening the two segments to determine whether the two segments verify correctly through the screening algorithm, and downloading the content to be downloaded when it is determined that the two segments verify correctly through the screening algorithm. Once the content has been successfully downloaded, the integrity of the downloaded content may be restored by removing the legitimate content that was previously inserted into the downloaded content.

These and other features and advantages of the present invention will become more apparent from the accompanying drawings and the following detailed description.

BRIEF DESCRIPTION OF THE DRAWINGS

FIG. 3 is a table illustrating the probabilities of success for an attacker when undertaking to download illicit material.

DETAILED DESCRIPTION OF THE INVENTION

The present invention provides methods which attack and circumvent screening algorithms that rely on a sampling of data, and, specifically, the proposed SDMI Lite screening algorithm as described herein. The methods are based on the concept of adulteration of content to the point where the attacker's chances of successfully admitting the illicit content are greatly improved.

Advantageously, the methods of the invention detect faults in the proposed security screening algorithm. It is only through the detection and identification of faults that the underlying screening algorithm can be improved to provide convenient, efficient and cost-effective protection for all content providers.

One goal of SDMI is to prevent the unlawful and illicit distribution of content on the Internet. In an attempt to accomplish this goal, SDMI has proposed methods of screening content that has been marked to be downloaded. One such proposal is the previously-mentioned SDMI Lite screening algorithm. Generally, the SDMI Lite screening algorithm randomly screens a predetermined number of sections of the marked content to determine whether the content is legitimate. However, the proposed SDMI Lite screening algorithm checks only two sections of the content being downloaded. Therefore, for a song which is three minutes in length, only thirty seconds of the song is being checked (assuming fifteen second test sections). The thirty seconds represents only one-sixth of the total content of the song. The new SDMI Lite screening algorithm was proposed in an attempt to increase the performance of SDMI.

Generally, the present invention is achieved by initiating an adulteration attack by inserting sections of other content into the illicit song. The inserted sections are self-consistent in the sense that, if the inserted section is selected by the screening algorithm, the inserted section will verify correctly through the SDMI Lite algorithm and other content-based screening algorithms such as the CDSafe algorithm. The CDSafe algorithm is described more fully in pending U.S. patent application Ser. No. 09/536,944, filed Mar. 28, 2000, in the name of inventors Toine Staring, Michael Epstein and Martin Rosner, entitled "Protecting Content from Illicit Reproduction by Proof of Existence of a Complete Data Set via Self-Referencing Sections," and is incorporated by reference herein.

Figure 1:
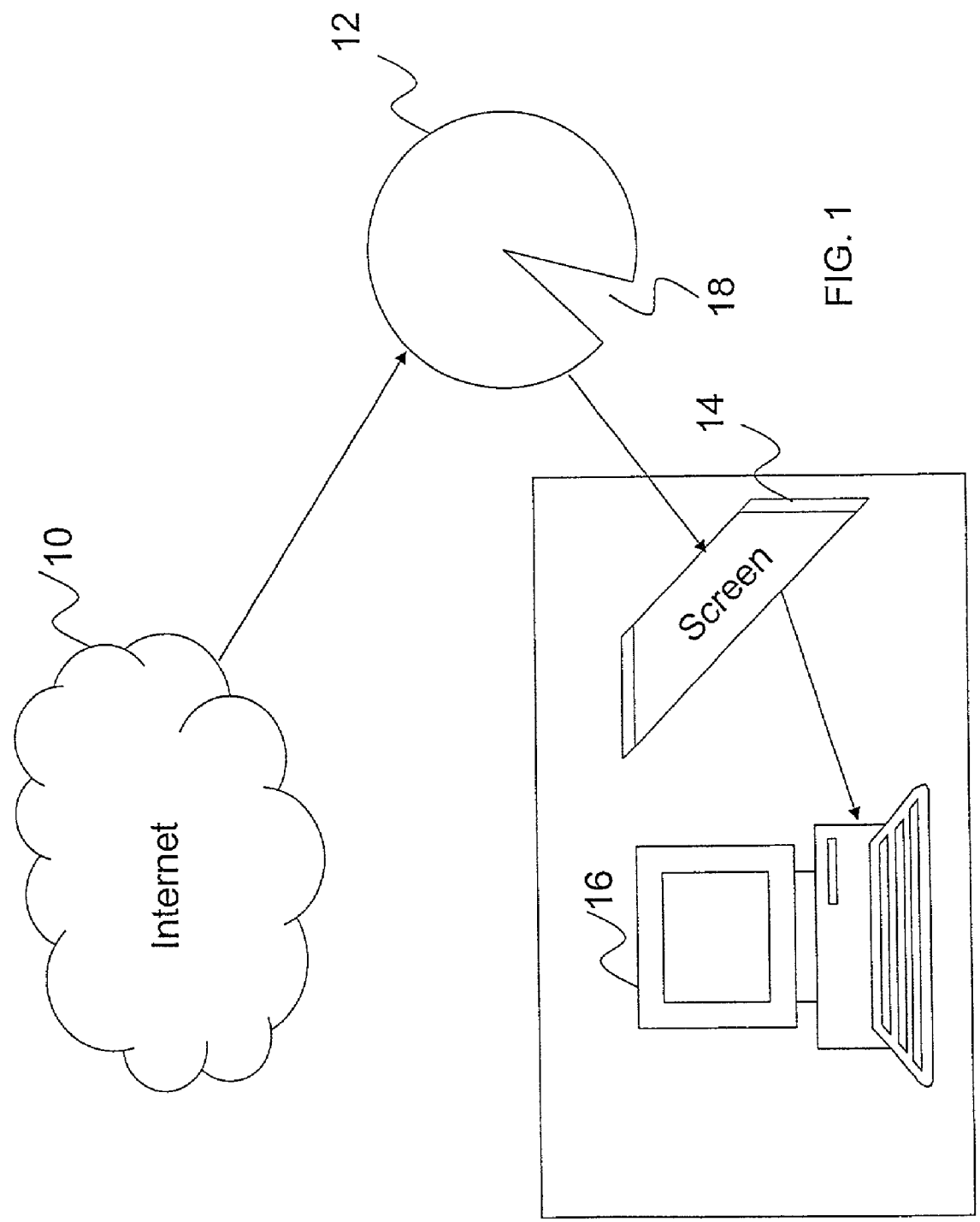
FIG. 1 is a schematic diagram illustrating a general overview of the present invention.

More specifically, with reference to FIG. 1 and in accordance with the present invention, one method of attacking the proposed SDMI Lite screening algorithm and the CDSafe algorithm is to "adulterate" the content that is proposed to be downloaded from an external source such as, for example, the Internet 10. As used herein, the term "adulterate" refers to the act of inserting music 18 from a song that is known to be legitimate into a song that the attacker knows to be illegitimate such that the illegitimate content 12 will pass the screening algorithm 14. That is, if the screening algorithm 14 can be tricked into believing that the proposed content to be downloaded is in fact a different song than the song that is actually being downloaded, then the screening algorithm 14 will allow the content 12 to be downloaded despite the fact that some portion of the downloaded content is actually being illegally distributed. Although illustrated as a separate element, screening algorithm 14 may be resident within memory within the personal computer 16, and executed by a processor of the personal computer 16. Once the content is downloaded, it may be written to a compact disk, personal digital assistant (PDA) or other device such as a memory coupled to or otherwise associated with a personal computer 16. At this point, the inserted (adulteration) material may be removed to restore the integrity of the illicit content. Although shown in FIG. 1 as a personal computer, element 16 may be implemented as a PDA, digital music player, wireless telephone or any other device having a processor and associated memory.

The method of attack described herein is made possible since only a small portion of the marked content is being screened. This type of attack would not be possible if every section of the marked content were screened to ensure that it is part of legitimate content. Since only two sections of the marked content are being screened, the screening algorithm is susceptible to being circumvented in accordance with the type of attack described herein. In the following discussion the term "segment" will be used to indicate a contiguous block of content containing one or more sections of content.

In an embodiment of the method of the present invention, two sections from the marked content will be chosen during the screening process. One section will be chosen from the beginning of the song and the other section will be chosen at random. Each of the sections will be replaced by segments of silence. Thus, during the screening process, if sections are chosen from within these two silence segments, the content will be permitted to be downloaded. Unmarked silence is accepted as legacy content according to the SDMI rules.

In another embodiment of the method of the present invention, and likely the most simplistic embodiment, the downloaded content may be adulterated by inserting a section of silence at the beginning of the song and a large segment of silence at the end of the song. Since a silence section has been placed at the beginning of the song, the first section chosen would certainly be silence and labeled as unmarked, the large amount of silence at the end of the song would create an excellent likelihood that the other (random) section would also contain silence as well. Thus, during the screening process, if two silence sections are chosen, the content will be permitted to be downloaded.

Figure 2:
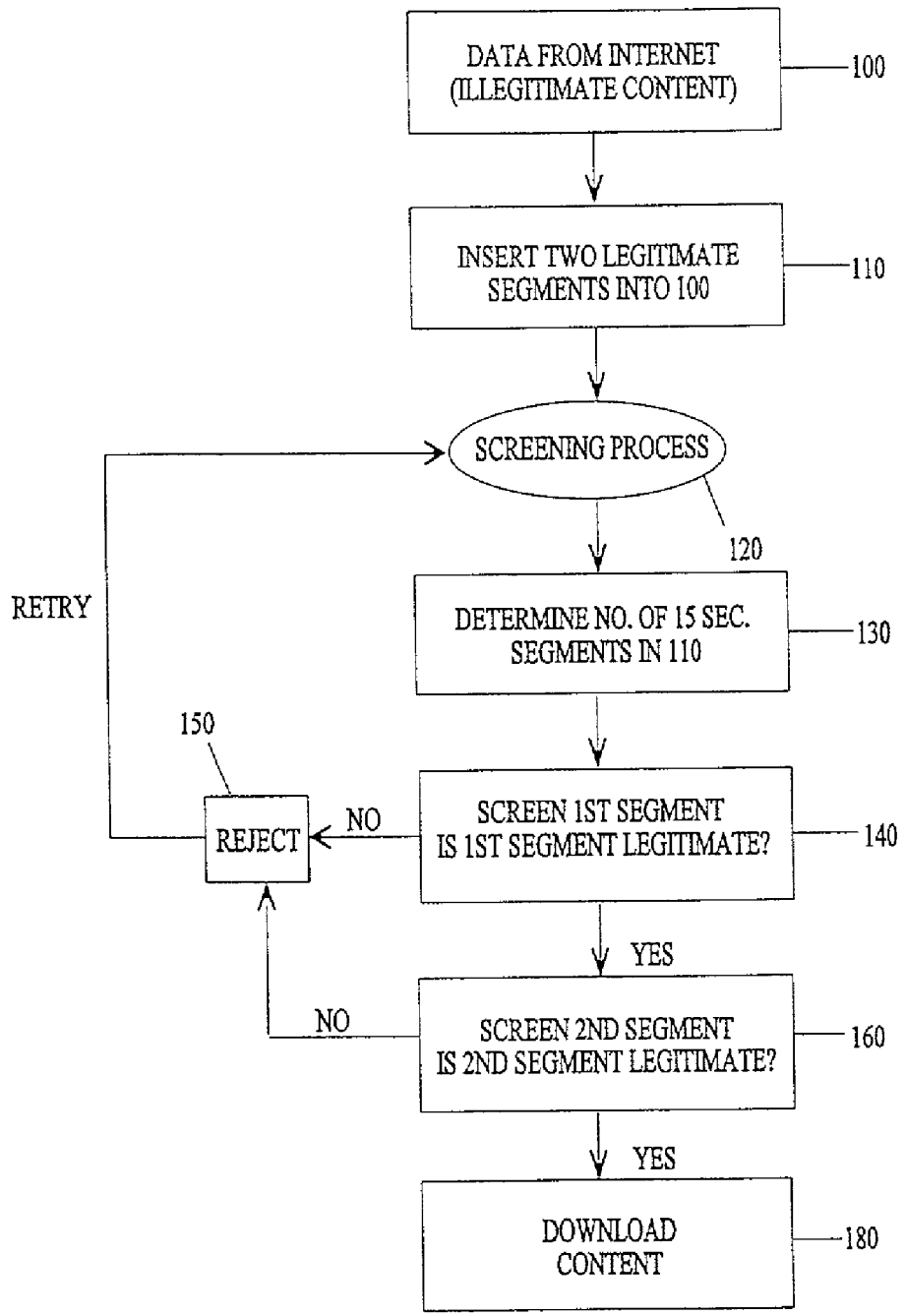
FIG. 2 is a flow diagram illustrating the steps of a method of attack on an SDMI screening algorithm based on adulteration of marked content in accordance with an illustrative embodiment of the present invention.

Referring now to FIG. 2, a flow diagram is shown illustrating the steps of the method of attack on a SDMI screening algorithm based on adulteration of the screened content in accordance with another illustrative embodiment of the present invention.

In step 100, the attacker will identify and mark content on the Internet which the attacker knows to be data that will not pass the screening of SDMI. The marked content is represented as content 12 in FIG. 1. Therefore, in step 110, in accordance with the present invention, the attacker will insert two segments of legitimate content into the data from the Internet which was identified in step 100. The legitimate content is illustrated in FIG. 1 as reference numeral 18. It is contemplated that larger or smaller segments of legitimate content may be inserted into the illegitimate content as will be described below with reference to FIG. 3. Upon completion of step 110, the attacker is ready to enter the SDMI screening process, as indicated by reference numeral 120.

Commencing the screening process, as indicated in step 130, a determination is made regarding the number of fifteen second segments that exist in the content that is to be downloaded. In step 140, a first segment is then identified and screened to determine whether the content passes the SDMI screening requirements. If an illegitimate segment is detected, the content will be rejected, as indicated by step 150. If, however, one of the two legitimate segments that were added by the attacker is detected, the content will pass the first part of the screening process. In step 160, the SDMI screening process identifies a second segment to be tested. If the section is found to be legitimate, the content will pass the screening process and will be permitted to be downloaded as indicated by step 180. If there is a failure at step 140 or step 160 then the attacker will make another attempt as indicated by the retry arrow returning from step 150 to step 120.

Although the method of circumventing the proposed SDMI Lite screening algorithm will not guarantee rapid success to the attacker, the likelihood that the attacker will be able to successfully download illegitimate content increases with the percentage of adulterated content. For example, where the attacker attempts to insert an illicit song after one section of a legitimate song, the probability of retrieving a legitimate section twice (thereby circumventing the SDMI screening algorithm) may be calculated using the following equation:

$$P=(1/x)^2$$

where P equals the probability of retrieving a legitimate section twice, and x equals the number of sections in the illicit song.

Likewise, when an attacker attempts to randomly insert two legitimate sections inside the illicit song, the probability of retrieving a legitimate section twice may be calculated using the following equation:

$$P=(2/x)^2$$

where P equals the probability of retrieving a legitimate section twice, and x equals the number of sections in the illicit song.

Thus, for example, if an attacker attempts to randomly insert an extra minute into a two minute selected song, the probability of retrieving a legitimate section twice is equal to $(4/12)^2$ or eleven percent (11%); where the number four (4) represents the number of fifteen second sections in the extra minute of legitimate content added by the attacker, and the number twelve (12) represents the number of sections (eight (8)) in the original two-minute illicit song plus the number of sections (four (4)) in the extra minute of legitimate content added by the attacker.

FIG. 3 is a table illustrating the probability of success for an attacker when attempting to download illicit material. More specifically, FIG. 3 lists the probabilities of downloading a plurality of different length illicit songs as a function of the number of legitimate sections present in the illicit song. The vertical axis lists the number of legitimate sections present in a song and the horizontal axis lists the various song lengths by seconds and number of fifteen second sections within the total song length. The probabilities listed in FIG. 3 are based on the assumption that the screening algorithm checks only two sections of each song.

As an example, with reference to FIG. 3, if the song length is 120 seconds (two minutes) and five (5) of the sections are legitimate sections that have been combined with three (3) sections of illegitimate marked content inserted into the song, the probability of getting the song (including the marked content) through the screening process is thirty-nine percent (39.1%).

The above-described embodiments of the invention are intended to be illustrative only. For example, although the present invention has been described with reference to the content constituting a single song, the invention is equally applicable to the download of an entire compact disk, as well as numerous other types of content. These and numerous other embodiments within the scope of the following claims will be apparent to those skilled in the art.

What is claimed is:

1. A method of attacking a screening algorithm, the method comprising the steps of:
   marking content to be downloaded;
   inserting at least one section of legitimate content into the marked content; and
   subjecting the marked content, having the at least one section of legitimate content inserted therein, to a screening algorithm.

2. The method of attacking a screening algorithm as recited in claim 1 wherein the screening algorithm is a Secure Digital Music Initiative screening algorithm.

3. The method of attacking a screening algorithm as recited in claim 1 wherein the screening algorithm relies on a sampling of data contained within the marked content.

4. The method of attacking a screening algorithm as recited in claim 1 wherein the marked content is downloaded from the Internet.

5. The method of attacking a screening algorithm as recited in claim 1 further comprising the step of writing the downloaded content to a memory device.

6. The method of attacking a screening algorithm as recited in claim 1 further comprising the step of restoring the integrity of the marked content by removing the legitimate content inserted into the marked content.

7. The method of attacking a screening algorithm as recited in claim 1 wherein the screening process includes the step of determining a number of segments of a predetermined duration of time which are included within the marked content having the at least one section of legitimate content inserted therein.

8. The method of attacking a screening algorithm as recited in claim 7 wherein the screening process further includes the steps of selecting at least two segments within the marked content; screening the at least two segments to determine whether the at least two segments verify correctly through the screening algorithm; and downloading the marked content when it is determined that the at least two segments verify correctly through the screening algorithm.

9. The method of attacking a screening algorithm as recited in claim 7 wherein the predetermined duration of time is fifteen seconds.

10. The method of attacking a screening algorithm as recited in claim 1 wherein the at least one section of legitimate content inserted into the marked content is a section of silence.

11. An apparatus for attacking a screening algorithm comprising:
a processor device for marking content to be downloaded and for inserting at least one section of legitimate content into the marked content, wherein the marked content having at least one section of legitimate content therein is subjected to a screening algorithm.

12. The apparatus for attacking a screening algorithm as recited in claim 11, further comprising:
a memory device associated with the processor device storing the content when the content passes through the screening algorithm.

13. The apparatus for attacking a screening algorithm as recited in claim 11, wherein the screening algorithm relies on a sampling of data contained within the marked content.

14. An article of manufacture for attacking a screening algorithm, the article comprising a machine readable medium containing one or more programs which when executed implement the steps of:
marking content to be downloaded;
inserting at least one section of legitimate content into the marked content; and
subjecting the marked content, having the at least one section of legitimate content inserted therein, to a screening algorithm.

15. The article of manufacture for attacking a screening algorithm as recited in claim 14 wherein the screening algorithm is a Secure Digital Music Initiative screening algorithm.

16. The article of manufacture for attacking a screening algorithm as recited in claim 14 wherein the screening algorithm relies on a sampling of data contained within the marked content.

17. The article of manufacture for attacking a screening algorithm as recited in claim 14 further comprising the step of writing the downloaded content to a memory device.

18. The article of manufacture for attacking a screening algorithm as recited in claim 14 further comprising the step of restoring the integrity of the marked content by removing the legitimate content inserted into the marked content.

19. The article of manufacture for attacking a screening algorithm as recited in claim 14 wherein the screening process includes the step of determining a number of segments of a predetermined duration of time which are included within the marked content having the at least one section of legitimate content inserted therein.

20. The article of manufacture for attacking a screening algorithm as recited in claim 19 wherein the screening process further includes the steps of selecting at least two segments within the marked content; screening the at least two segments to determine whether the at least two segments verify correctly through the screening algorithm; and downloading the marked content when it is determined that the at least two segments verify correctly through the screening algorithm.

* * * * *